(12) United States Patent
Saxton et al.

(10) Patent No.: US 6,178,895 B1
(45) Date of Patent: Jan. 30, 2001

(54) FLAT-SURFACED FLOOR STRUCTURE FOR BOXCARS

(75) Inventors: Gregory J. Saxton, Gresham, OR (US); Bruce D. Becker, Vancouver, WA (US)

(73) Assignee: Gunderson, Inc., Portland, OR (US)

( * ) Notice: Under 35 U.S.C. 154(b), the term of this patent shall be extended for 0 days.

(21) Appl. No.: 09/294,775

(22) Filed: Apr. 19, 1999

(51) Int. Cl.[7] .................................................. B61D 17/10
(52) U.S. Cl. ........................ 105/422; 105/396; 105/404; 296/204
(58) Field of Search ..................................... 105/396, 397, 105/404, 422, 375; 296/181, 182, 204

(56) References Cited

U.S. PATENT DOCUMENTS

| | | | |
|---|---|---|---|
| 2,575,454 | * 11/1951 | Kuhler | 105/397 |
| 3,026,821 | * 3/1962 | Oakley | 105/422 |
| 3,319,393 | * 5/1967 | Tantlinger et al. | 52/496 |
| 4,645,258 | * 2/1987 | Ohmura et al. | 296/204 |
| 5,549,350 | * 8/1996 | Akiyama et al. | 296/204 |
| 5,918,549 | * 7/1999 | Basile et al. | 105/422 |

* cited by examiner

*Primary Examiner*—S. Joseph Morano
*Assistant Examiner*—Frantz F. Jules
(74) *Attorney, Agent, or Firm*—Chernoff, Vilhauer, McClung & Stenzel, LLP

(57) ABSTRACT

A floor plate assembly for a railway freight car structure. The assembly includes a floor plate and set of floor plate support assemblies, each having a base and at least one side wall. The side wall has an outer margin that in some embodiments is welded to the floor plate. A reinforcing bar is welded to the base and has a margin which is located closely adjacent to the floor plate and which is welded to the floor plate in some embodiments. In some embodiments the floor plate support assemblies each have two side walls and the reinforcing bar is welded to the base between the side walls. The floor plate support assemblies may be formed away from the railway freight car that is under construction by using a jig to facilitate welding the reinforcing bar to the base. The floor plate assembly may also be assembled separately and then may be efficiently welded to the members of the freight car underframe. A floor plate assembly may include a channel, that includes a flange projecting horizontally from one side wall, to join together neighboring floor plate assemblies.

13 Claims, 8 Drawing Sheets

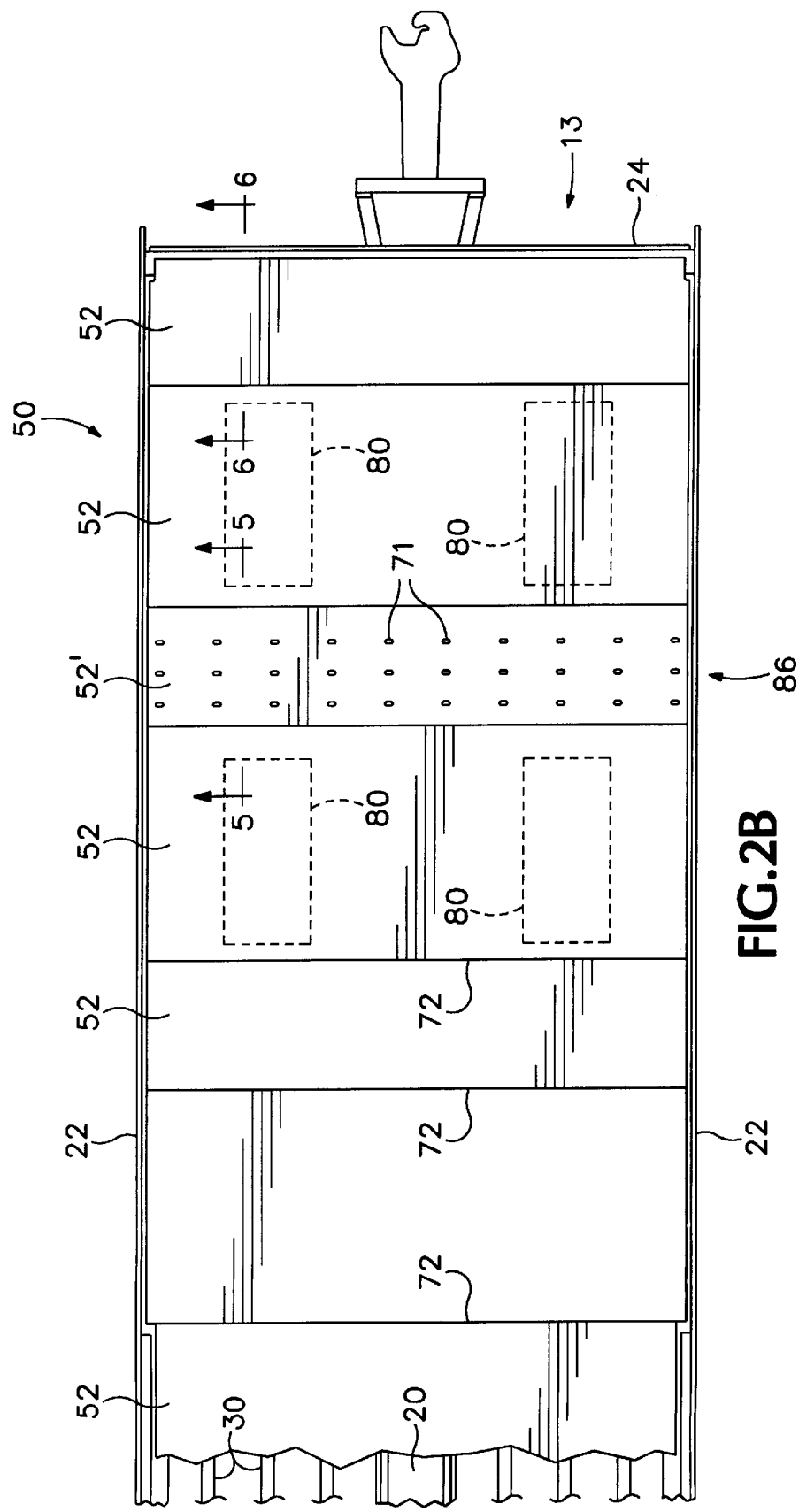

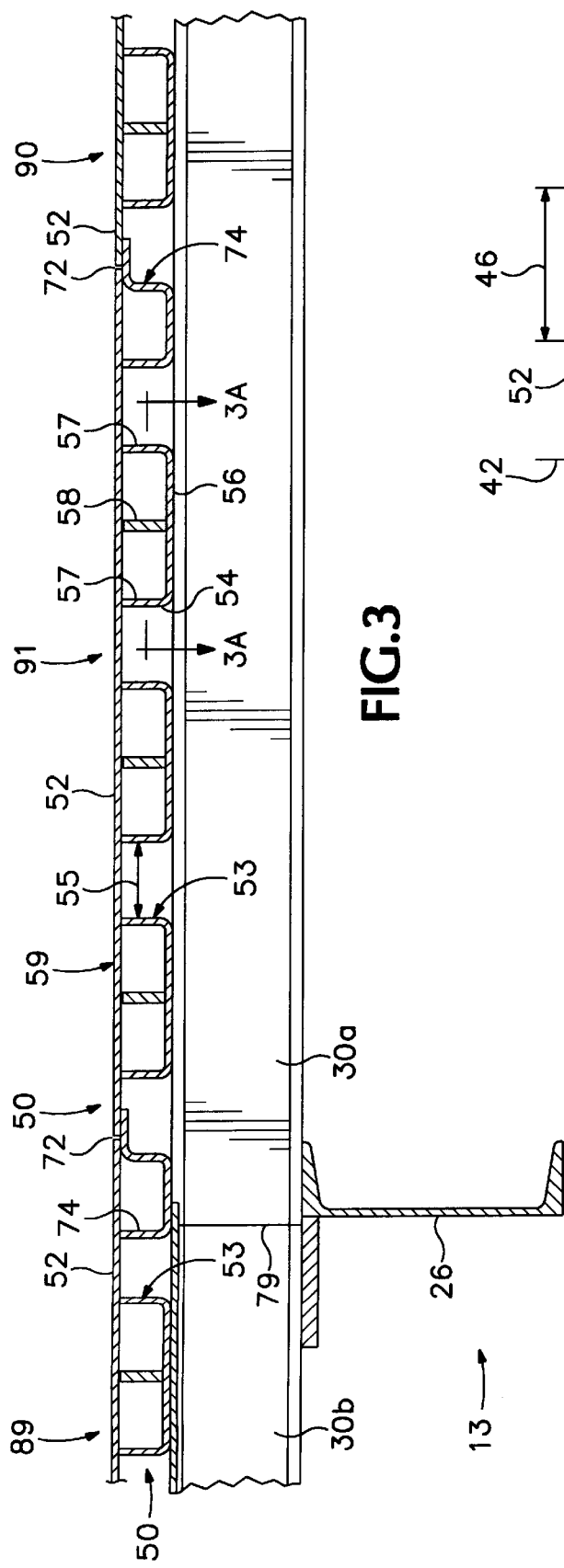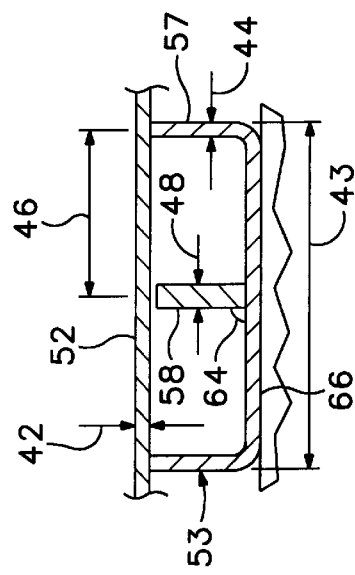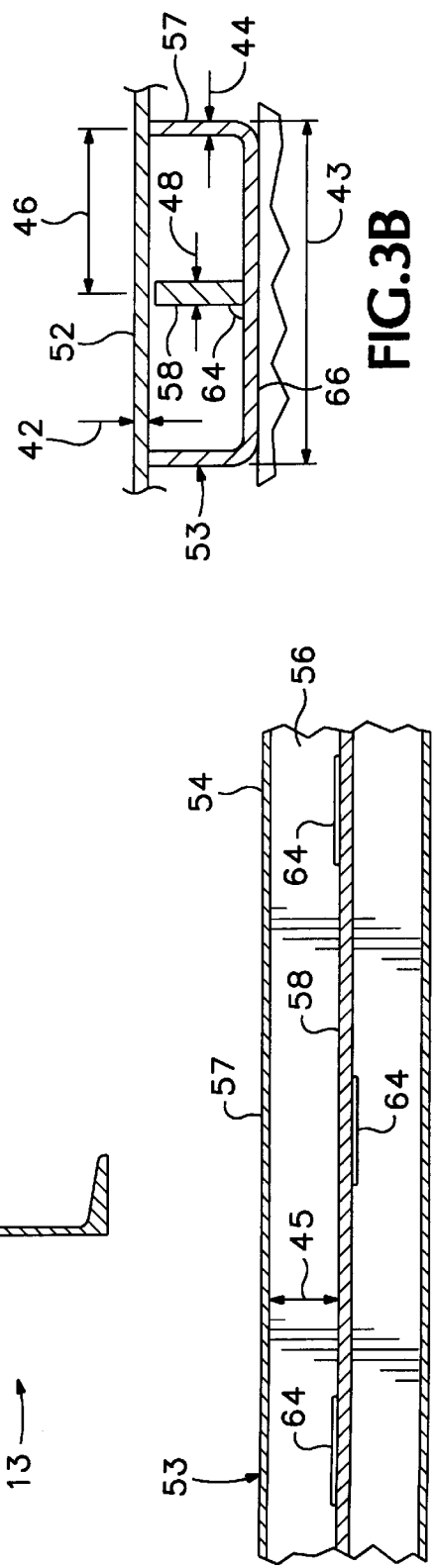

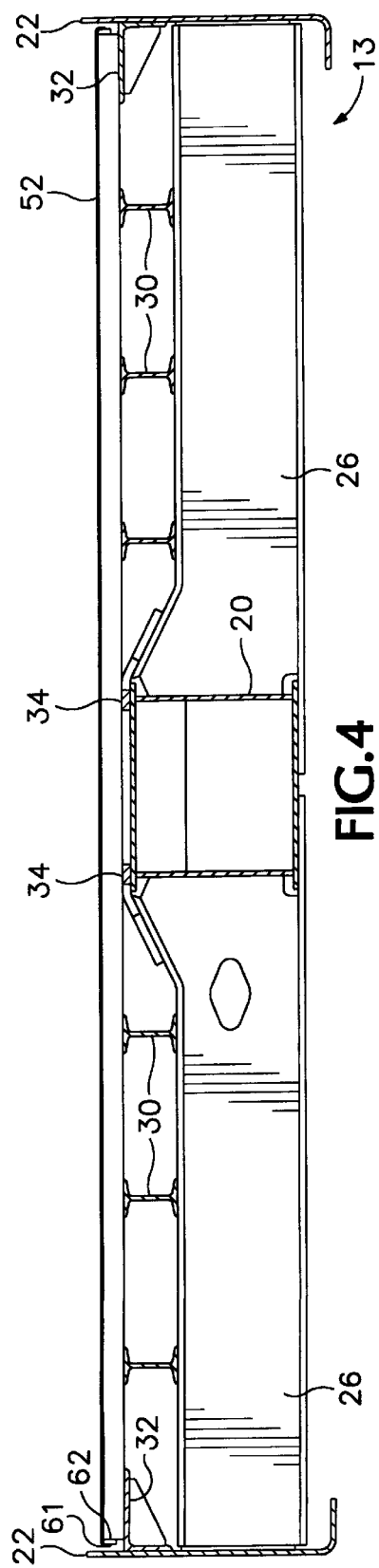
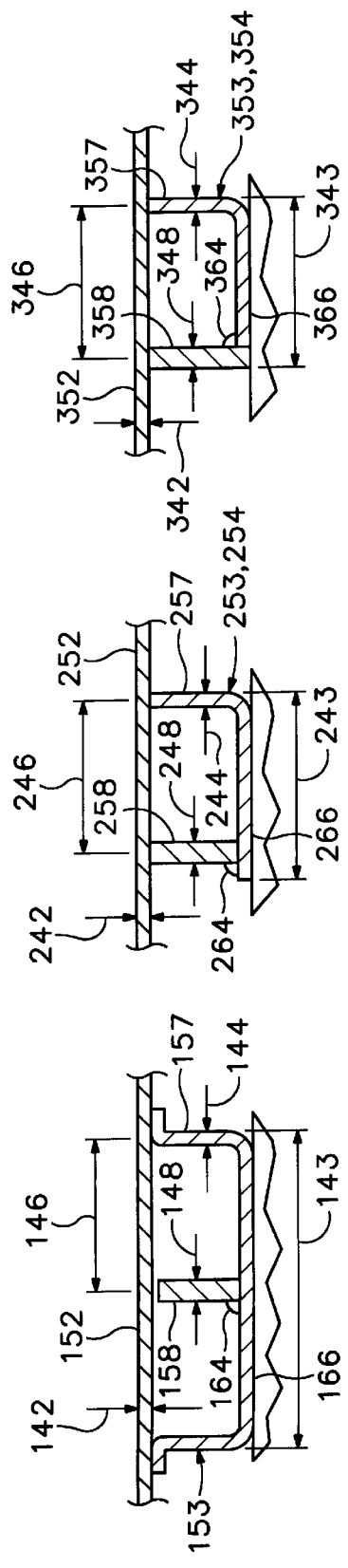

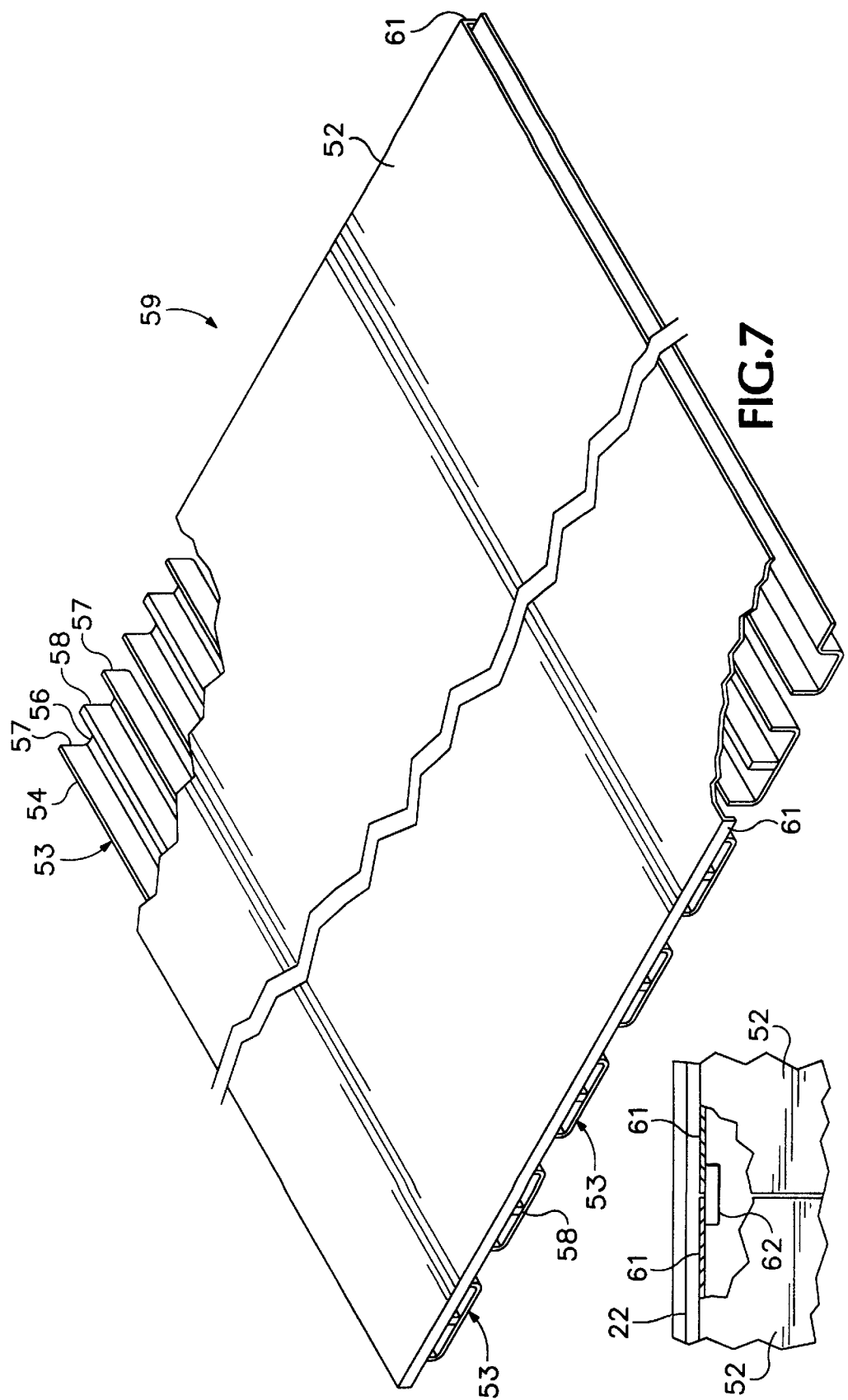

FLAT-SURFACED FLOOR STRUCTURE FOR BOXCARS

BACKGROUND OF THE INVENTION

The present invention has to do with a flat-surfaced floor structure for a railroad boxcar.

The floor structure of a boxcar must support the weight of the contents of the boxcar and is carried on an underframe that is, in turn, supported by two wheeled trucks. Additionally, the floor structure must support the weight of loading machinery, such as a loaded forklift that travels within the boxcar, without suffering significant permanent deformation. One boxcar floor structure design criterion that is generally recognized in the industry is the ability to withstand a lift truck axle load of 60,000 pounds without suffering permanent deformation. Furthermore, these goals should be achieved with a minimum weight, in order to allow a maximum load to be placed in the boxcar without exceeding the maximum weight limit for a loaded boxcar. The floor surface should also be as close to the top of rail as possible, to allow as much vertical clearance within the boxcar as possible, as the height of the boxcar roof is limited by clearance requirements. Cost of manufacture is also of concern in a boxcar floor design, because boxcars are sold in a competitive market.

In the past, most boxcar floor structures have been formed so as to allow nails to be driven into the floor at various places to secure loads. In the industry this is termed a "nailable floor." Such floors are typically formed by placing abutting formed steel "planks" or channels, open side down, over the longitudinal stringers of the boxcar underframe so that nails can be inserted between and held by the abutting formed channels. Although this continues to be a useful configuration for the floor of a boxcar, there are some applications, such as hauling paper rolls or other goods having a relatively delicate exterior, for which a flat floor is preferred.

For a flat floor it is generally necessary to support a set of flat plates over the stringers. As the stringers are not typically arranged closely enough together to adequately support the plates, it is necessary to position closely spaced structural members transversely over the stringers. Heretofore, the members of choice for this function have been formed steel channels, installed with their webs, or side walls, vertical and their bases horizontal. The vertical webs, or side parts, of these channels are able to support a heavy load, whereas the horizontal, or base, portions can be attached to the stringers or provide reinforcement for the floor plates.

One floor structure that is currently available uses steel floor plates and formed channels that are both of material 3.797 mm (0.1495") thick. The formed channels are 52.3875 mm (2-1/16") wide and are spaced 50.8 mm (2") apart. This assembly is heavier than is desirable. Another floor structure also uses 3.416 mm (0.1345") thick steel sheet both as the top sheet and for formed "hat"-shaped support members. In this assembly the formed hat-shaped members are spaced with a pitch of 152.4 mm (6"). Unfortunately, this arrangement suffers permanent deformation when a loaded 60,000-pound fork lift axle load travels over it. A floor structure that is not prone to permanent deformation from the weight of a loaded 60,000-pound lift truck axle load, but that is not substantially heavier than existing floor structures would be highly desirable.

One element of boxcar underframe design that has traditionally presented a challenge to design engineers is the accommodation of the wheels of the boxcar. In most designs, the pattern of structural elements that is present over most of the area of the boxcar floor would contact the wheels if it was extended into the wheel wells. In a prior construction, to avoid this occurrence, the pattern of structural members is interrupted, forming a well to accommodate each wheel. A heavy gauge steel plate defining a through-hole for accommodation of a wheel is attached to the underframe above each wheel, to provide the needed structural strength. Unfortunately, these heavy gauge plates must be specially made and add weight to the boxcar.

In one prior art nailable floor, each formed channel plank that bridges the wheel well is reinforced with a steel plate that closes the downwardly facing channel. The extra strength imbued to the floor structure by this addition permits the omission of the heavy gauge steel plates necessary in previous designs.

What is needed, then, is a floor structure that can withstand the weight of loaded 60,000-pound fork lift axle load without suffering permanent deformation, yet is lighter and can be more economically constructed than previously existing floor structures.

SUMMARY OF THE INVENTION

The present invention answers the aforementioned needs by providing a floor plate assembly for a railway freight car structure and a floor plate support assembly for use in such a floor plate assembly.

In one embodiment of the invention the floor plate support assembly includes a channel member having a base and at least one side wall having an outer margin. A reinforcing bar is welded to the base and has a margin parallel to and aligned with the margin of the side wall. A floor plate assembly which is one preferred embodiment of the present invention includes a plurality of such floor plate support assemblies arranged parallel with each other and fastened to a flat floor plate.

A separate aspect of the present invention provides a floor plate assembly adapted to be supported by the stringers of a railway boxcar structure and comprising a structural member having a base, a pair of side walls extending from the base and each side wall having an outer margin, with a flange extending outwardly from the outer margin of one of the pair of side walls, and a pair of adjacent floor plates, each adjacent floor plate being supported at least in part by the flange.

An additional separate aspect of the present invention is the provision of a railway car, comprising a pair of wheeled trucks, a body bolster supported by each truck, a pair of side sills supported by the body bolsters, a center sill supported in part by the body bolsters and a set of cross bearers spanning from the side sills to the center sill, supported by the side sills and supporting the center sill. A set of stringers are supported by the cross bearers and in turn support a set of floor plate support assemblies, each support assembly having a base, a pair of side walls and a reinforcing bar welded to the base between the side walls and extending substantially parallel to the side walls. Finally, a set of floor plates are welded to and supported by the floor plate support assemblies.

A further separate aspect of the present invention is a method of producing a boxcar floor structure including a floor plate, including the steps of providing an elongate structural member having a base and at least one side wall extending away from the base, welding a reinforcing bar to the structural member so that it extends longitudinally parallel to the side wall, and attaching a floor plate to the structural member.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 2B is a partially cutaway top plan view of the boxcar floor structure of the rightmost portion of the car shown in FIG. 1, taken in the direction of line 2B—2B.

FIG. 3 is a section view of a part of the floor structure of FIGS. 2A and 2B taken along line 3—3 of FIG. 2A.

FIG. 3A is a section view of a part of the floor structure of FIGS. 2A and 2B taken along line 3A—3A of FIG. 3.

FIG. 3B is a section view of a floor detail of the plate support assembly and part of a floor plate of the floor structure shown in FIG. 3, at an enlarged scale.

FIG. 4 is a section view of a part of the floor structure of FIGS. 2A and 2B taken along line 4—4 of FIG. 2A.

FIG. 7 is a perspective view of a floor segment used in the floor structure of FIGS. 2A and 2B.

FIG. 8 is a partially cutaway detail view, at an enlarged scale, of the portion of the floor structure included in circle "FIG. 8" in FIG. 2A.

FIG. 10 is a section view taken in a direction similar to that of FIG. 3B, showing a variant floor plate support assembly and part of a floor plate assembly which is an alternative embodiment of the invention.

FIG. 11 is a section view taken in a direction similar to that of FIG. 3B, showing a variant floor plate support assembly and part of a floor plate assembly that is an additional alternative embodiment of the invention.

FIG. 12 is a section view taken in a direction similar to that of FIG. 3B, showing a variant floor plate support assembly and part of a floor plate assembly that is a further additional alternative to the invention.

DETAILED DESCRIPTION OF THE PREFERRED EMBODIMENT

Figure 1:
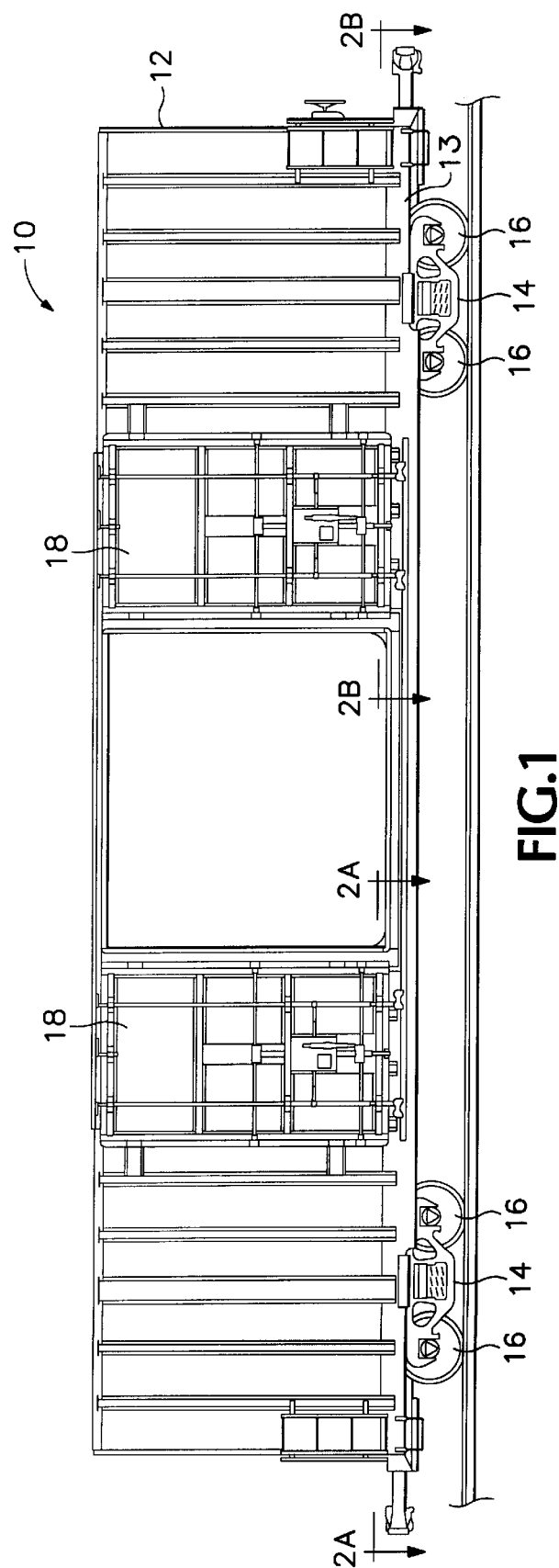
FIG. 1 is a side view of a boxcar including a floor which embodies the present invention.

Referring to FIG. 1, a railway freight car, or more specifically a boxcar 10, embodying the present invention, shares a number of structural characteristics with most other boxcars. First, there is an upper box structure 12 which is supported by an underframe 13 of welded construction, which is in turn supported by a pair of trucks 14. Each truck includes a set of wheels 16 and a set of doors 18. A pair of body bolsters 19 (see FIG. 5) are massive transversely-extending portions of the boxcar underframe that are adapted to mate with the trucks 14.

Figure 2A:
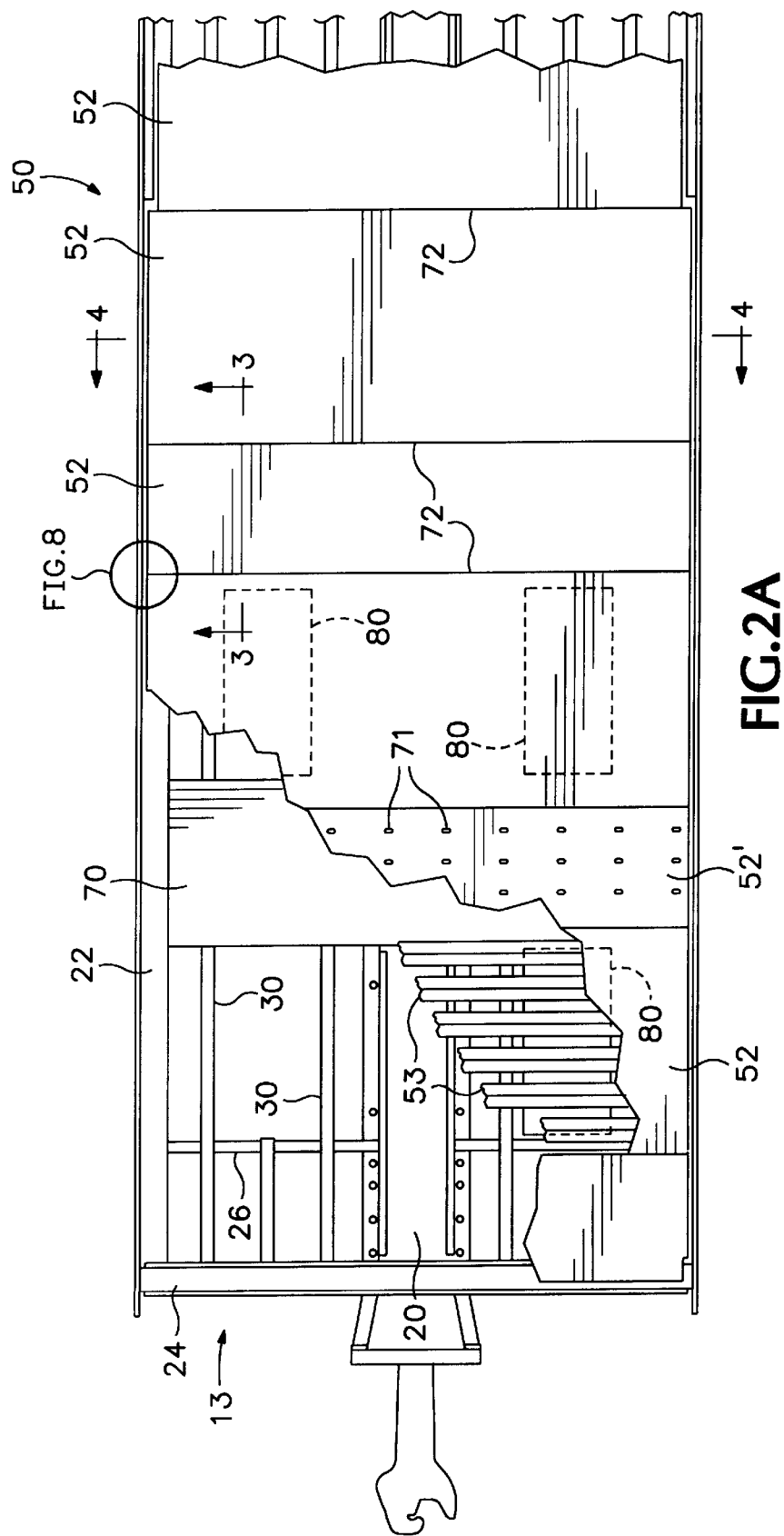
FIG. 2A is a partially cutaway top plan view of the boxcar floor structure of the leftmost portion of the car shown in FIG. 1, taken in the direction of line 2A—2A.
Figure 6:
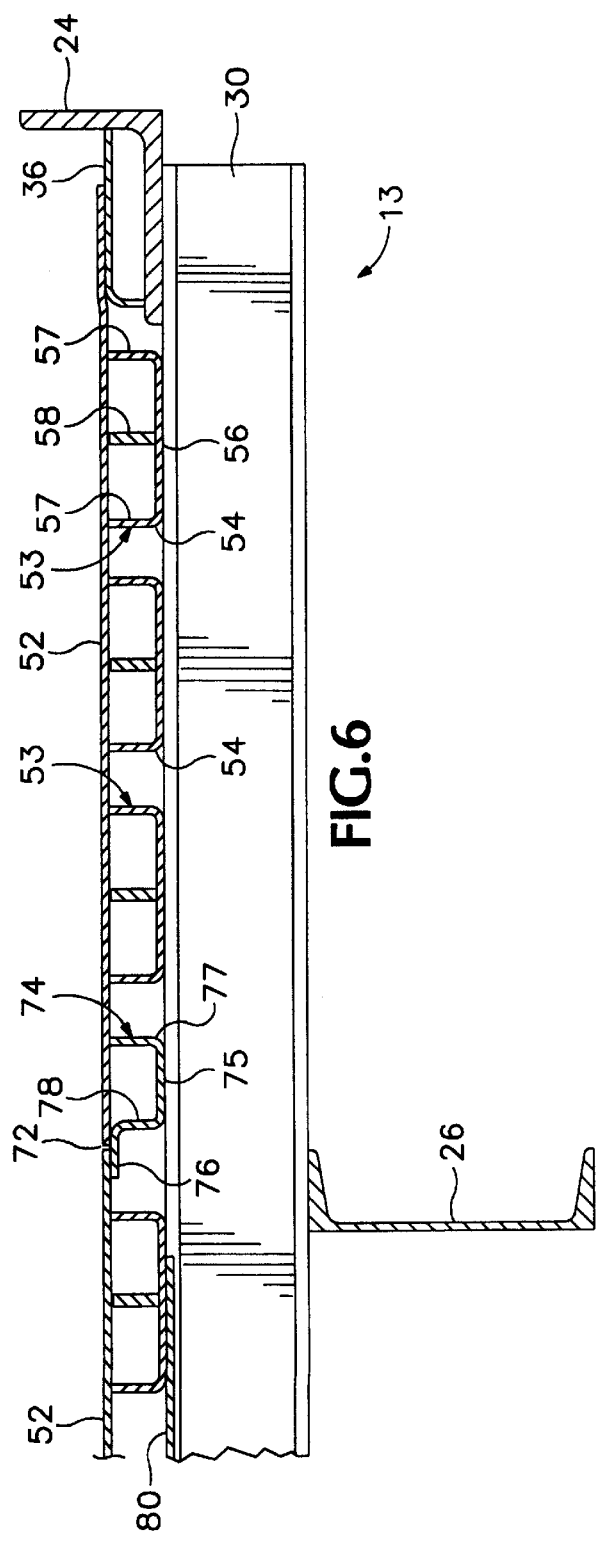
FIG. 6 is a section view of a part of the floor structure of FIGS. 2A and 2B taken along line 6—6 of FIG. 2B.

Referring specifically to FIGS. 2A and 4, a longitudinal center sill 20 and a pair of side sills 22 provide the principal backbone to hold the car 10 together longitudinally and to transfer the weight of the car body and its lading to the trucks 14 and body bolsters 19. A pair of end sills 24 provide transverse support at the longitudinal ends of boxcar 10. Cross bearers 26, in the form of rolled channel beams (see FIGS. 3 and 6) are attached to and extend transversely from the center sill 20 to the side sills 22 at spaced-apart locations along the center sill 20. The cross bearers 26 help support the center sill 20 from the side sills 22, which are in turn supported by the body bolsters 19. A set of conventional longitudinally extending supports or stringers 30 are supported by the cross bearers 26, and in turn support a floor structure 50 that embodies the present invention. Also supporting floor structure 50 are a set of longitudinal angle members 32 included in the side sills 22, cross bearer attachment plates 34, and end sill support members 36. A set of steel sheet floor plates 52 includes floor plates 52 near the center of the length of boxcar 10 that are of lesser width to permit clearance for the boxcar doors 18.

Referring to FIGS. 3, 3A, 3B and 7, a floor plate assembly 59 which is a preferred embodiment of the present invention includes the floor plates 52 of 10-gauge sheet steel, which thus have a thickness 42 preferably of 3.416 mm (0.1345") and must be supported over the stringers 30 in such a manner that driving a loaded 60,000-pound left truck axle load over plates 52 does not cause significant permanent deformation, either as local dishing or failure as a unit spanning the space between stringers. In order to achieve this end, it is necessary to provide fairly closely spaced elements to support the plates 52. Additionally, these elements must be of sufficient strength that they do not themselves permanently deform under the weight of the lift truck. Moreover, this support structure for the plates 52 should be as light and easy to construct as possible.

To meet these requirements, floor structure 50 includes several floor plate assemblies 59, 89, 90, 91, each including a set of floor plate support assemblies 53. The floor plate support assemblies 53 are arranged parallel with each other and spaced apart from each other by a distance 55 of, preferably, 73 mm (2-⅞"). Each floor plate support assembly 53 includes a structural member 54 in the form of a channel, which includes a base 56 and a pair of webs or side walls 57. Referring to FIG. 3B, members 54 have a width 43 preferably of 12.38 cm (4-⅞") along the base 56. Each member 54 is preferably formed of steel sheet having a thickness 44 of 3.416 mm (0.1345") thick (10-gauge steel). Preferably, steel having yield strength of at least 60,000 psi is used for both the floor plates 52 and the channel members 54.

A reinforcing bar 58 is welded in a position centrally located between side walls 57. From the center of a side wall 57 to the center of the reinforcing bar 58 is a distance 46 of 6.02 cm (2.37") in a preferred embodiment. The reinforcing bar 58 is preferably of the same material as the channel members 54, and has a thickness 48 that is preferably at least about 1.5 times as thick as base 56 and side walls 57. The reinforcing bar 58 thereby has column strength to resist crushing locally, while it also contributes to the beam strength of assembly 53. Thus, with a thickness 48 of 6.35 mm (¼") in a preferred reinforcing bar there is a distance 45 of only 5.53 cm (2.18") between the reinforcing bar and the side wall 57. Additionally, reinforcing bar 58 has a height of 34.925 mm (1-⅜") nominally leaving a gap of 1.34 mm (53 mils) to floor plate 52 so that the plate 52 can be welded tightly to the margins of the side walls 57 of the member 54. Skilled persons will recognize that reinforcing bars 58 need not be a solid rectangle as shown but may take any form capable of providing support to floor plate 52 without adding unnecessary weight.

One limitation of the channels formed of steel sheet used as floor plate supports in the prior art is that they have a uniform thickness throughout. Therefore, the strength of the channel side walls, for a given composition of the metal, cannot be augmented without adding to the weight of the entire channel, including the base. By welding reinforcing bars 58 having a greater thickness into members 54, this limitation is avoided, allowing a floor plate support assembly 53 that is increased in floor support strength without requiring the full weight increase that would be necessary for this strength increase in a simple formed channel. It will be understood that this principle can be employed in floor plate support assemblies of different sizes to achieve high strength at a minimum weight, and the dimensions of the floor plate assembly 59 are of only one preferred embodiment of the invention.

Referring to FIG. 3A, reinforcing bar 58 is skip welded onto base 56 at welding sites 64. Because skip welding satisfies the strength requirements for support assemblies 53, skip welding provides labor and energy savings by comparison to continuous welding. Moreover, the welding operation to produce support assemblies 53 may be performed in an efficient manner away from the boxcar that is under construction, using a jig. The greater thickness of the reinforcing bars 58, with respect to the channels 54, avoids a number of handling problems that would be encountered if the bars 58 were thinner. First, the bars 58 stand upright on a flat surface, such as is presented by each base 56, more easily than would a thinner bar. Second, the reinforcing bars 58 are rigid enough so that they do not curve about during handling as would thinner bars. The avoidance of these problems facilitates the handling of the bars 58 and thereby the production of support assemblies 53.

Reinforcing bar 58 extends outwardly from base 56, no further, and preferably just slightly less, as explained above, than do the side walls 57, so that it will not prevent either of the side walls 57 from contacting the flat surfaces that they must support and/or to which they must be welded. This also helps to create a flatter floor, because the number of potential irregularities in the support structure of floor plates 52 is reduced.

Referring to FIG. 7, a floor plate assembly 59 may be welded together away from the boxcar that is under construction. FIG. 7 shows a down-turned overhanging lip 61 of floor plate 52, also shown in FIG. 4. FIG. 8 shows the lips 61 of two adjacent floor plates 52 welded together with a joining plate 62.

Referring to FIGS. 2A, 2B, and 3, because more than one floor plate assembly 59 (plus others) is included in the floor 50 of boxcar 10, a seam 72 is formed between neighboring plates 52. To hold two neighboring plates together, a flanged channel floor plate support 74, having a horizontal base 75, a pair of upright parallel side walls 78 and 77, and a horizontal flange 76 extending outwardly from the top of side wall 78, is used is used in a first floor plate assembly 59, to which the floor plate 52 of an adjacent floor plate assembly 90 is welded. The flange 76 provides a flat, upwardly facing surface on which a) pair of neighboring plates 52 are supported, welded together with each other and to the flange 76 with a strong and durable connection. After being constructed, each floor plate assembly 59, 90, etc., is welded to an adjacent one of such floor plate assemblies and to the underframe 13 at the intersection of support assemblies 53 with stringers 30, longitudinal angle members 32, and end sill support members 36.

Figure 5:
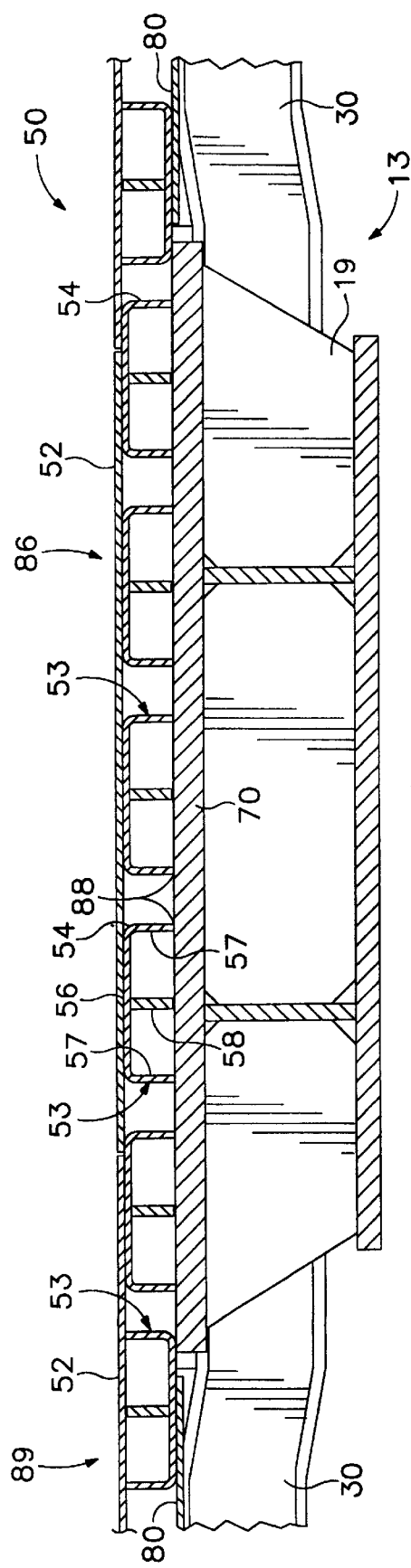
FIG. 5 is a section view of a part of the floor structure of FIGS. 2A and 2B taken along line 5—5 of FIG. 2B.

A few areas of the underframe structure of the boxcar 10 impose special requirements upon floor structure 50. Body bolsters 19 include an upper steel plate 70. The preassembly of an entire floor plate assembly 59 is not practical for the floor plate assembly portion 86 of the floor structure 50 that is positioned over the steel plate 70, because there would be no efficient way to weld the support assemblies 53 to the plate 70 in the interior of assembly 59. Referring to FIG. 5, to facilitate the welding of floor plate support assemblies 53 to plate 70, support assemblies 53 are positioned with their side walls 57 extending downwardly from their bases 56. This provides a sharp right angle between support assemblies 53 and the surface of the plate 70 where welds 88 can be formed, leaving the base 56 of each floor plate support assembly 53 facing upward. A floor plate 52' shown in FIGS. 2A and 2B is welded onto the support assemblies 53 fastened to the cover plate 70, using a set of through-holes 71. The through-holes 71 are preferably located to register with the reinforcing bar 58 of each floor plate support assembly 53, and must be filled flush with welding material so as to leave a flat finished plate 52'.

Another set of structural portions of special interest are the wheel wells of the boxcar 10. To accommodate the wheels 16 of boxcar 10 while keeping the height of the top of the floor 50 as low as practical, a portion of a stringer 30 is omitted in the vicinity of each wheel 16. For example, in FIG. 3, stringer 30a terminates at 79, directly to the left of the cross bearer 26, so that the stringer 30b, located closer to the side sill 22 as seen in FIGS. 2 and 4, is visible in FIG. 3. Referring to FIGS. 2A, 2B, 5 and 9, in a preferred embodiment of the present invention, a doubler plate 80, preferably of 3.416 mm (0.1345 in) thick (10 gauge) steel sheet, is welded to the bottom of the supports 53 where they span the wheel well. Plate 80 defines through-holes 82 to facilitate this welding operation. The strength added by plate 80 permits the heavy gauge steel plates of the prior art to be omitted.

Three preferred variants to preferred floor plate support assembly 53 are shown in FIGS. 10, 11 and 12 and may be used in alternative preferred embodiments to floor structure 50, which are otherwise constructed in the same manner as structure 50. Floor plate support assemblies 153, shown in FIG. 10, each include a structural member 154 having a base 166 and sidewalls 157. Similar to assembly 53, assembly 153 includes a reinforcing bar 158 welded to base 166. A distinguishing characteristic of assembly 153, however, is a pair of flanges, extending outwardly from the outer margin of both sidewalls 157 at a right angle to each sidewall 157.

A floor plate support assembly 253, shown in FIG. 11 includes an L-shaped structural member 254 having a base 266 and a single side wall 257. A reinforcing bar 258 is welded to the top of the base 266 at welding site 264 to complete assembly 253. Unlike assembly 53 or assembly 153, reinforcing bar 258 may extend outwardly the same distance as or farther than sidewall 257 as it is accessible for welding to a floor plate 252.

Floor plate support assembly 353, shown in FIG. 12, is similar to assembly 253, having an L-shaped structural member 354, that has a base 366 and a side wall 357. In assembly 358, however, reinforcing bar 258 is welded to the side of a base 366, which is slightly shorter than base 256, at welding site 364, which has been moved relative to welding sites 64, 164 and 264. In one embodiment, both the reinforcing bar 358 and the side wall 357 are welded to a top plate 352.

The dimensions of floor plate support assemblies 153, 253 and 353 indicated by distances 142, 143, 144, 146 and 148; 242, 244, 246 and 248; and 342, 344, 346 and 348, respectively, are similar or identical to those of assembly 53 identified by reference numerals differing by 100, 200 or 300.

Figure 9:
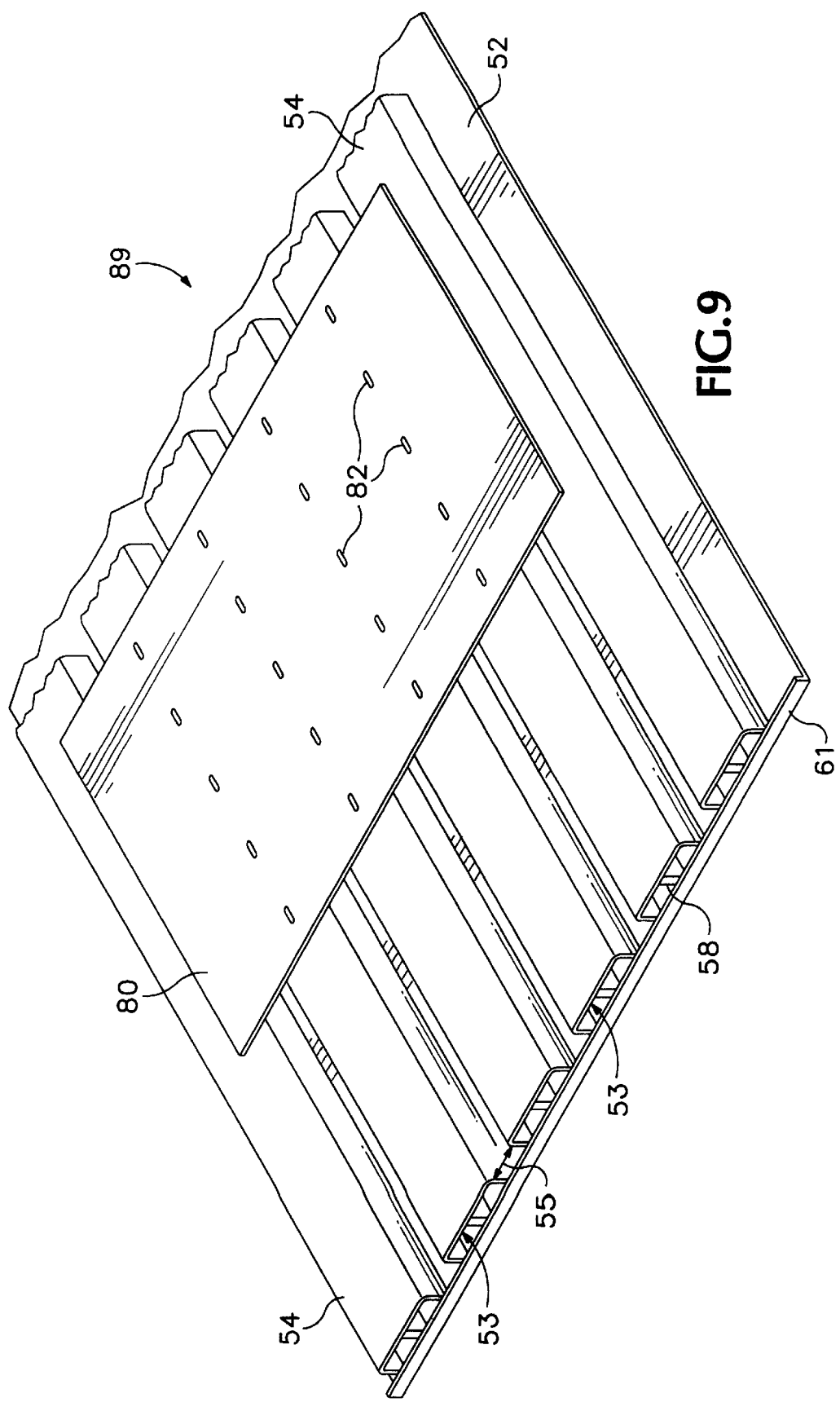
FIG. 9 is a perspective view showing the bottom side of a floor segment that includes a doubler plate and is used in the floor structure of FIGS. 2A and 2B.

Width 243 of assembly 253 and width 343 of assembly 353 are reduced relative to width 43 because only two vertical supports, reinforcing bar 258 or 358 and single side wall 257 or 357, are provided by assemblies 253 and 353. If distances 243 and 343 were substantially the same as distances 43 and 143 there would be too much space between the vertical supports of assemblies 253 and 353. The distance between adjacent floor plate support assemblies 153 and 353, should therefore be about the same as the distance 55 between adjacent floor plate support assemblies 53 as shown in FIG. 3 or FIG. 9.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A floor plate support assembly for a railway freight car, comprising:
   (a) an elongate structural member having a base and at least one side wall, said base and said side wall both having a first thickness; and
   (b) a reinforcing bar having a thickness at least 1.5 times as great as said first thickness, said reinforcing bar being welded to said base in an upright orientation and extending along said elongate structural member parallel with said side wall thereof, said side wall having a planar margin and said reinforcing bar having an outer margin extending parallel with said planar margin and located approximately as far as said planar margin from said base.

2. The floor plate support assembly of claim 1 wherein said at least one side wall comprises two side walls having coplanar margins and said reinforcing bar outer margin is located no further from said base than are said coplanar margins.

3. A floor plate assembly for a railway freight car, comprising:
   (a) a floor plate;
   (b) a plurality of apart-spaced parallel floor plate support assemblies each welded to said floor plate and including:
      (i) a channel-shaped structural member having a pair of parallel side walls and a base, each of said side walls having an outer margin, said outer margins being welded to said floor plate; and
      (ii) a reinforcing bar welded to said base between said side walls and having an outer margin located closely adjacent to said floor plate.

4. The floor plate assembly of claim 3 wherein said reinforcing bar protrudes slightly less far from said base than do said side walls, thereby defining a gap between said floor plate and said reinforcing bar.

5. The floor plate assembly of claim 3 wherein said base and said side walls of said channel member are of a substantially equal thickness and said reinforcing bar is at least approximately 1.5 times as thick as said base and said side walls.

6. The floor plate assembly of claim 3 wherein said reinforcing bar is skip welded to said base.

7. The floor plate assembly of claim 3 wherein said outer margin of at least one of said side walls includes a flange extending outwardly along said floor plate.

8. A floor plate assembly for a railway freight car, comprising:
   (a) a floor plate;
   (b) a floor plate support assembly including:
      (i) a channel-shaped structural member having a pair of parallel side walls and a base, each of said side walls having an outer margin, said outer margins being welded to said floor plate; and
      (ii) a reinforcing bar welded to said base between said side walls in an upright orientation and having a margin located closely adjacent to said floor plate; and
   (c) at least one additional said floor plate support assembly with said outer margins of said side walls of said channel-shaped structural member thereof welded to said floor plate in a similar orientation.

9. A floor plate assembly for a railway freight car, comprising:
   (a) a floor plate;
   (b) a floor plate support assembly including:
      (i) a channel-shaped structural member having a pair of parallel side walls and a base, each of said side walls having an outer margin, said outer margins being welded to said floor plate; and
      (ii) a reinforcing bar welded to said base between said side walls in an upright orientation and having a margin located closely adjacent to said floor plate; and
   (c) a doubler plate welded to said base in opposition to said floor plate.

10. A floor plate support assembly for a railway freight car, comprising:
    (a) an elongate structural member having a base and a single side wall, both said base and said side wall having a first thickness; and
    (b) a reinforcing bar member having a thickness at least 1.5 times as great as said first thickness, welded to said base and extending along said elongate structural member parallel with said side wall thereof, said side wall having a planar margin and said reinforcing bar having an outer margin extending parallel with said planar margin and located approximately as far as is said planar margin of said side wall from said base, and said planar margin being located no closer to said base than is said planar margin of said side wall.

11. An improved railway freight car, comprising:
    a pair of wheeled trucks;
    a pair of body bolsters each supported by a respective one of said trucks;
    a pair of side sills supported by said pair of body bolsters;
    a center sill, supported by said pair of body bolsters;
    a set of cross bearers extending between said side sills and interconnected with said center sill and said side sills; and
    a set of stringers supported by said cross bearers and extending longitudinally of said car;
    wherein the improvement comprises:
    (a) a floor structure having a flat upper surface and comprising a plurality of elongate structural members arranged parallel with each other and supported on said stringers, each of said elongate structural members having:
       (i) a base;
       (ii) a pair of side walls, both said base and at least one of said side walls having a first thickness and each said side wall having a planar margin spaced apart from said base; and (iii) a reinforcing bar welded to said base between said side walls in an upright orientation and extending substantially parallel to said side walls, said reinforcing bar having a thickness at least 1.5 times as great as said first thickness, and said reinforcing bar having an outer margin extending parallel with said planar margins and located approximately as far as said planar margins from said base; and (b) a floor plate welded to and supported by said elongate structural members.

12. A method of producing a boxcar floor structure, comprising:

(a) providing a plurality of similar elongate channel members each having a base and a pair of side walls extending upwardly from said base, said base and said side walls all having a first thickness and said side walls having planar margins spaced apart from said base and parallel with each other;

(b) welding a reinforcing bar that is thicker than said first thickness to said base of each said channel member between said side walls in an upright orientation so that said reinforcing bar extends longitudinally of said elongate channel member and parallel with said side walls and so that an outer margin of said reinforcing bar is located approximately coplanar with said planar margins of said side walls; and (c) thereafter welding said planar margins of each of said channel members to one face of a floor plate, with said channel members spaced apart from one another, without welding said reinforcing bar to said floor plate.

13. A floor plate assembly for a railway freight car, comprising:

(a) a floor plate support assembly including:

(i) an elongate channel member formed of metal having a first thickness and having a relatively wide base and a pair of parallel side walls having coplanar margins; and (ii) a reinforcing bar having a thickness at least 1.5 times as great as said first thickness, welded to said base in an upright orientation and extending along said channel member between and parallel with said side walls thereof, said reinforcing bar having an outer margin extending parallel with said coplanar margins and located no further than said coplanar margins from said base; and (b) a floor plate welded to said floor plate support assembly.

* * * * *

UNITED STATES PATENT AND TRADEMARK OFFICE
CERTIFICATE OF CORRECTION

PATENT NO.    : 6,178,895 B1
DATED         : January 30, 2001
INVENTOR(S)   : Saxton et al.

It is certified that error appears in the above-identified patent and that said Letters Patent is hereby corrected as shown below:

Column 3,
Line 23, change "view of a floor detail of the plate" to -- view of a detail of the floor plate --

Column 5,
Line 58, change "a)" to -- a --

Signed and Sealed this

Twenty-second Day of October, 2002

Attest:

JAMES E. ROGAN
Attesting Officer    Director of the United States Patent and Trademark Office